United States Patent [19]
Revells et al.

[11] 3,905,794

[45] Sept. 16, 1975

[54] GLASS SHEET SUPPORTING, SHAPING AND CONVEYING APPARATUS

[75] Inventors: Robert G. Revells; Donald D. Rahrig, both of Toledo; Floyd T. Hagedorn, Oregon, all of Ohio

[73] Assignee: Libbey-Owens-Ford Company, Toledo, Ohio

[22] Filed: Oct. 17, 1974

[21] Appl. No.: 515,488

[52] U.S. Cl. ...................... 65/106; 65/104; 65/273; 65/275; 65/374
[51] Int. Cl.² ........................................ C03B 23/02
[58] Field of Search ............. 65/106, 107, 273, 275, 65/374, 104

[56] References Cited
UNITED STATES PATENTS

| | | | |
|---|---|---|---|
| 3,485,615 | 12/1969 | Rahrig et al. | 65/275 X |
| 3,545,951 | 12/1970 | Nedelec | 65/107 X |
| 3,831,239 | 8/1974 | Hoff et al. | 65/106 X |

*Primary Examiner*—Arthur D. Kellogg
*Attorney, Agent, or Firm*—Collins, Oberlin & Darr

[57] ABSTRACT

A method of and apparatus for supporting and conveying glass sheets in a bending apparatus on a series of conveyor rolls having arcuately curved central portions normally disposed in an upper common horizontal plane for supporting a flat sheet of heat-softened glass to be bent and pivotable into a lower position out of engagement with said flat sheet upon engagement thereof along its marginal edge portions by the shaping rail of an upwardly movable female press member. Each conveyor roll comprises a fixed inner core member and an outer load supporting sleeve rotatable about the inner core member for supporting and conveying a glass sheet thereon.

18 Claims, 8 Drawing Figures

GLASS SHEET SUPPORTING, SHAPING AND CONVEYING APPARATUS

BACKGROUND OF THE INVENTION

The present invention relates generally to glass supporting and conveying apparatus and, more particularly, to specially configurated, flexible, pivotal conveyor rolls utilized in a press bending apparatus.

Generally, in the commercial production of curved or bent glass sheets in large quantities, such as is encountered in the mass production of glazing closures for automobiles and the like, the sheets are supported in a horizontal plane and advanced on externally driven roll-type conveyors in a horizontal path successively through a heating area, a bending area and a heat treating area for annealing or tempering the bent sheets.

The heated glass sheets are advanced from the heating furnace into the bending area and accurately located therein between complemental upper and lower shaping members by the engagement of the leading edges thereof with locating stops positioned in the path of movement of the advancing sheets. When properly oriented, the sheet is engaged along its marginal edge portions by the lower press member and lifted from the conveyor rolls for pressing between the complemental shaping surfaces of the press members to the desired curvature.

One critical problem encountered in the production of glazing closures by the above known process is the occurrence of certain optical defects, commonly known as "roll distortion", in the finished glazing closures. Such distortion is caused by the marring of the glass sheet surfaces due to the relative frictional movement between the glass surfaces and the rotating conveyor rolls when the sheet is in the heat-softened condition necessary for proper bending. This relative movement is most likely to occur when advancing movement of the sheet is interrupted by the locating stops while the conveyor rolls continue to rotate. Even if the timing is precisely controlled so that the initiation of the glass lifting operation occurs simultaneously upon glass stoppage to avoid any time lag therebetween, the heat-softened central portions of the glass sheets located inwardly of the press contacting marginal edges thereof sag sufficiently to remain in contact with the rotating conveyor rolls for at least a limited time.

While this distortion can be tolerated in vertically disposed glazing closures, it becomes more pronounced in those glazing closures intended for mounting at relatively steep angles, such as the backlights of the more recently styled automobiles for example, and poses serious optical problems interferring with clear or true vision therethrough.

SUMMARY OF THE INVENTION

Accordingly, it is a primary object of the present invention to obviate the above disadvantages by providing an improved method of and apparatus for supporting and conveying glass sheets in a press bending apparatus.

It is another object of this invention to provide a method of and apparatus for supporting and conveying glass sheets in a manner eliminating relative movement between the contacting surfaces of the glass sheet and the conveyor rolls to preclude marring and distortion of the surfaces of the sheets.

A further object of the present invention is to provide an improved flexible conveyor roll of generally arcuate form rotatable about its own axis and pivotal between a first position for supporting a flat sheet of glass prior to the bending thereof and a second position extending at an angle to the horizontal plane of the first position for supporting a bent sheet of glass while maintaining the desired curvature imparted thereto.

The glass sheet supporting and conveying apparatus of this invention is characterized by the provision of a series of improved conveyor rolls located in a bending apparatus and having arcuately curved central portions pivotal in unison between a first position wherein the central portions lie in a common horizontal plane for supporting and conveying a flat glass sheet and a second position out of engagement with the sheet wherein the central portions lie in planes extending at angles to such horizontal plane. Each of the improved conveyor rolls comprises an inner core member fixed against rotation and an outer sleeve mounted for rotation about and relative to the inner core member.

The foregoing and other objects, advantages, and characterizing features of the present invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
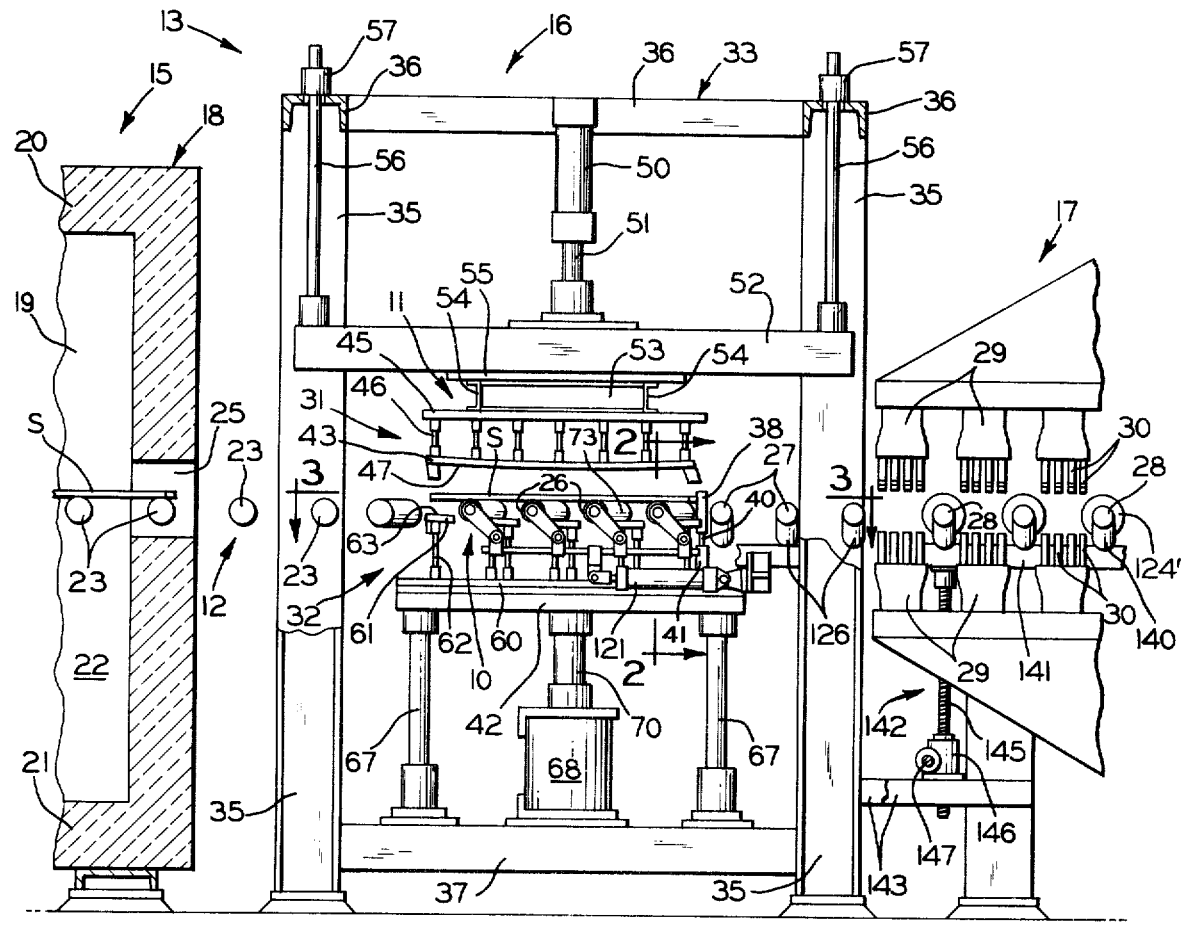
FIG. 1 is a side elevational view of a bending apparatus interposed between a glass heating and tempering section and incorporating the glass sheet supporting and conveying apparatus of this invention.

Referring now in detail to the illustrative embodiment depicted in the accompanying drawings, there is shown in FIG. 1 a glass sheet supporting and conveying apparatus, generally designated 10, constructed in accordance with this invention, incorporated in a glass sheet press bending apparatus 11, and forming a part of a continuous conveyor system, comprehensively designated 12. The conveyor system 12 forms a component part of a bending and tempering apparatus, generally designated 13, particularly adapted for use in the production of bent, tempered glass sheets by a continuous process in which the sheets to be treated are supported and moved successively along a predetermined path on conveyor system 12 through a heating section 15, a bending section 16 incorporating the bending apparatus 11, and a tempering section 17, the sections being contiguous so that a sheet passes immediately from one section to the next succeeding section.

In the illustrated embodiment, the heating section 15 comprises a tunnel-type furnace 18 having a heating chamber 19 defined by a top wall 20, a bottom wall 21, and opposite side walls 22, all formed of a suitable refractory material. The chamber 19 can be heated in any desired manner by suitable heating means, such as gas fired burners or electrical resistance elements for example (not shown), located in the top and side walls of the furnace 18. The sheets S are advanced through the heating chamber 19 on a series of conveyor rolls 23, which form a part of the conveyor system 12, and extend from the entrance end (not shown) of the furnace 18, through an oppositely disposed exit end and toward the bending section 16. The sheets S are heated to substantially the softening point of the glass during their passage through the chamber 19 and, upon emerging from an opening 25 in the exit end of the furnace 18, are received on a second series of conveyor rolls 26 forming a part of the supporting and conveying apparatus 10 of this invention, which moves the sheets to and within the bending section 16 between a pair of press members, hereinafter more fully described, and which impart the desired curvature to the sheets S.

After bending, the sheets S are advanced along the path and are transferred from the conveyor rolls 26 onto a third set of conveyor rolls 27, forming a part of the conveyor system 12, and which move the bent sheets S to the tempering section 17 and onto a fourth series of conveyor rolls 28, also a part of the conveyor system 12. The bent sheets S are advanced on the rolls 28 through the tempering section 17 wherein their temperature is rapidly reduced to produce the proper temper in the glass. In the embodiment illustrated in FIG. 1, the tempering section 17 includes cooling means comprising upper and lower blastheads 29 disposed above and below the path of movement of the glass sheets and which are provided with a series of tubes 30 operable to direct opposed streams of cooling fluid, such as air or the like, toward and against the opposite surfaces of the sheets S moving along such path.

The bending apparatus 11 comprises an upper male press member 31 and a lower female press member 32 having opposed complemental shaping surfaces conforming to the desired curvature of the sheet to be bent. The press members 31 and 32 are mounted for relative movement toward and away from each other on a structural frame 33, which includes a framework of vertically disposed columns 35 and horizontally extending beams 36 interconnected and tied together to form a rigid, box-like structure. A base member 37 extends between the upright columns 35 for supporting the female press member 32 and associated parts. The male press member 31 is mounted above the conveyor rolls 26 for vertical reciprocal movement relative to frame 33 while the female press member 32 is located below the conveyor rolls 26 and mounted for vertical reciprocal movement toward and away from the male press member 31.

A pair of laterally spaced locator stops 38 are positioned in the path of movement of the advancing glass sheets S to accurately position the same in the desired location relative to the press members 31 and 32. Each stop 38 is secured to the distal end of a piston rod 40 of a fluid actuating cylinder 41 mounted on a carriage 42. The cylinders 41 are operative to raise and lower the stops 38 between an upper position above conveyor rolls 26 in the path of movement of the glass sheet S and a lower position therebeneath.

In the illustrative embodiment shown in FIG. 1, the male press member 31 is of outline or ring-type construction and comprises a continuous shaping rail 43 connected to a base member 45 by a plurality of connecting rods 46. The shaping rail 43 conforms in outline to the glass sheets S to be bent and is provided with a downwardly directed, generally convex shaping surface 47 on the lower surface thereof to impart the desired curvature to the sheet. However, the particular outline of the shaping rail 43, as well as the specific curvature of the shaping surface 47, is dictated by the desired shape of the glass sheet being bent and can vary widely, as desired. Also, a conventional male mold having a substantially continuous shaping surface may be used in lieu of the ring-type press member 31, if desired.

The means for supporting the male press member 31 on frame 33 includes at least one actuating cylinder 50 (FIG. 1) mounted on one of the upper horizontal beams 36 and having a suitable reciprocable piston (not shown) provided with a piston rod 51 connected at its outer end to a vertically reciprocable platen frame 52. The base member 45 of the male press member 31 is connected to the platen frame 52 for movement therewith by means of interconnected structural members 53 and 54 and a support plate 55 extending transversely of the platen frame 52. A plurality of guide posts 56 are connected at their lower ends to the four corners of platen frame 52, respectively, and extend upwardly through suitable bushings 57 mounted on upper horizontal beams 36 for sliding movement relative thereto to properly guide platen frame 52 during its vertical reciprocal movement.

The female press member 32 is also of outline or ring-type construction and comprises a base member 60 secured to the carriage 42 and a shaping rail 61 connected to the base member 60 in spaced relation thereto by means of a series of connecting rods 62. The shaping rail 61 conforms in outline to the glass sheets S to be bent and is provided on its upper face with a generally concave shaping surface 63 complementary to the male press member shaping surface 47 in opposed relation thereto. To permit displacement of the female shaping rail 61 above the level of the conveyor rolls 26 for lifting the sheets thereabove into pressing engagement with the male shaping rail 43, the female shaping rail 61 is formed of a plurality of segments (FIG. 3) including end bars 65 extending generally in the direction of rolls 26 and side bars 66 extending generally transversely to the conveyor rolls 26 and spaced apart from each other a sufficient distance to pass between adjacent rolls 26. As compared to rolls 23, the diameter of rolls 26 are formed relatively small to provide maximum clearance therebetween for the passage of the female press member segments therethrough.

The carriage 42 is supported by a pair of guide members 67 (FIG. 1) and vertically movable by a fluid actuator 68 mounted on base member 37 and having a suitable piston rod 70 for raising and lowering the female press member 32 between its lower position beneath conveyor rolls 26 and its upper position thereabove for lifting a heated glass sheet S from the conveyor rolls 26 and pressing the same against the male press member 31 between the complemental shaping surfaces 47 and 63, thus forming the glass sheet into the desired curvature. After bending, piston rod 70 is retracted to lower the female press member 32 below conveyor rolls 26, depositing the bent sheet thereon for advancement into the tempering section.

In conventional glass press operations, the flat glass sheets, heated to the required softening or bending temperature, are transferred from the heating area onto straight, linear conveyor rolls for advancement into the bending apparatus. As each sheet arrives between the press members, it is halted by engagement of its leading edge with reciprocal locator stops movable into the path of movement of the sheet. A serious problem encountered in such operations is the marring or distortion of the glass sheet surface caused by the relative movement of the peripheral surfaces of the rotating rolls and the heat-softened glass sheet supported thereon and held stationary against the locator stops. Even under optimum bending conditions where the bending operation is carefully monitored so that the female press member engages and begins to lift the sheet at the same time it engages the locator stops, there will be relative movement between the rolls and certain portions of the glass sheet. The reason for this is that the female press member engages only the marginal edge portions of the glass sheet and the inner central portions thereof, which have been previously heat-softened, tend to sag or remain in contact with the rolls for a limited time while the marginal edge portions are being lifted off the rolls. This roll contact is sufficient to impart objectionable distortion in the central portion of the glass sheet, which central portion becomes the viewing area when mounted in an automotive vehicle or the like. Moreover, when mounted at a rather steep angle of inclination, such as when used as a backlight for example, the distortion becomes pronounced to create a serious optical problem.

Figure 2:
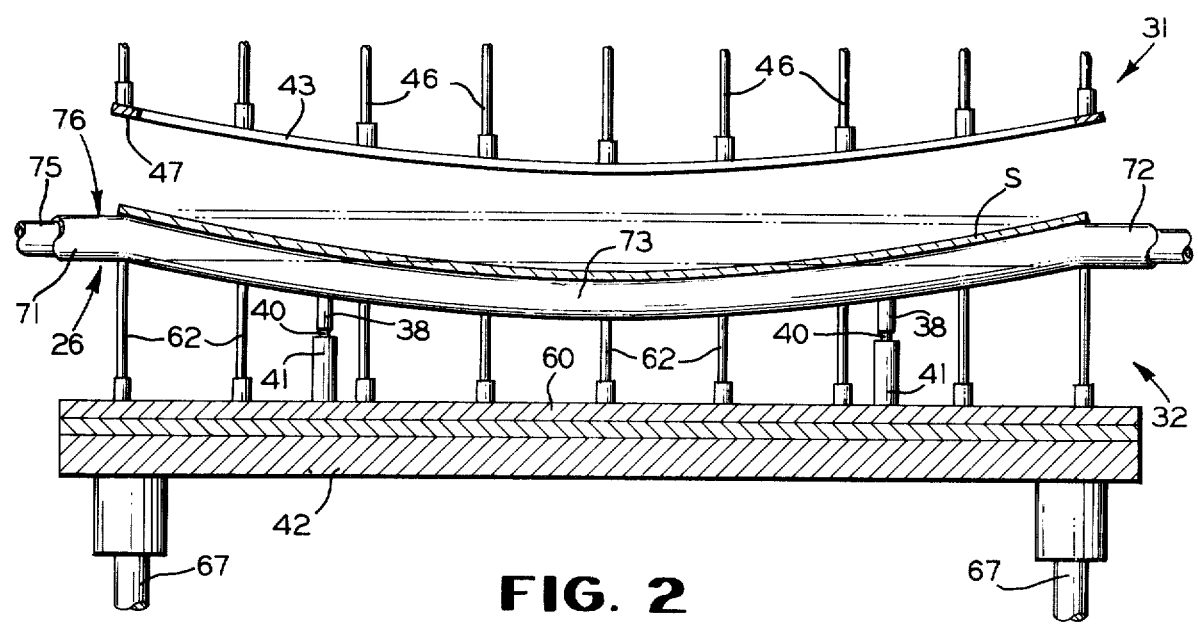
FIG. 2 is a vertical sectional view, on an enlarged scale, taken along the line 2—2 of FIG. 1.
Figure 3:
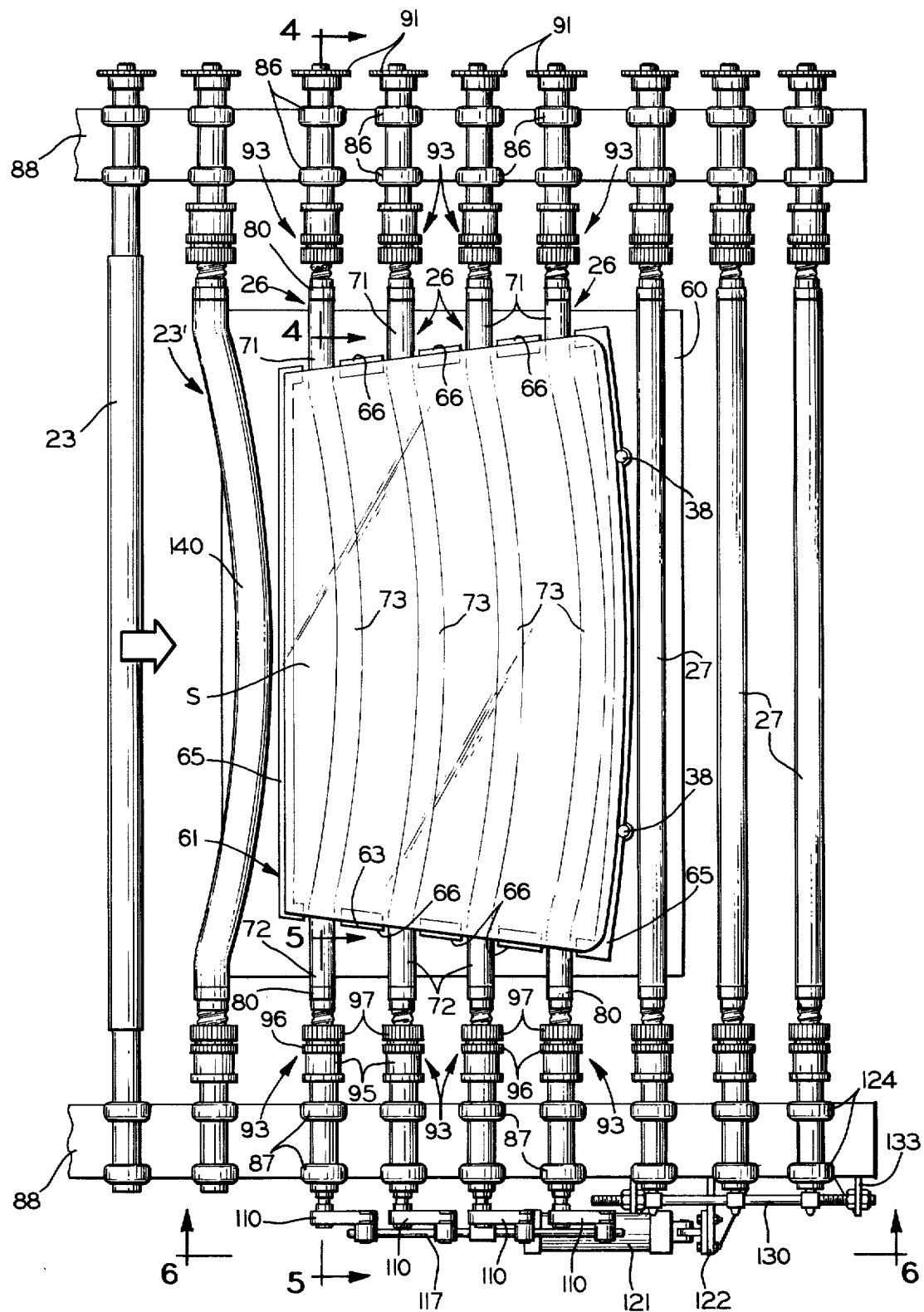
FIG. 3 is a partial top plan view, on an enlarged scale, looking in the direction of arrows 3—3 of FIG. 1, and showing the conveyor rolls in relation to the lower press member.
Figure 4:
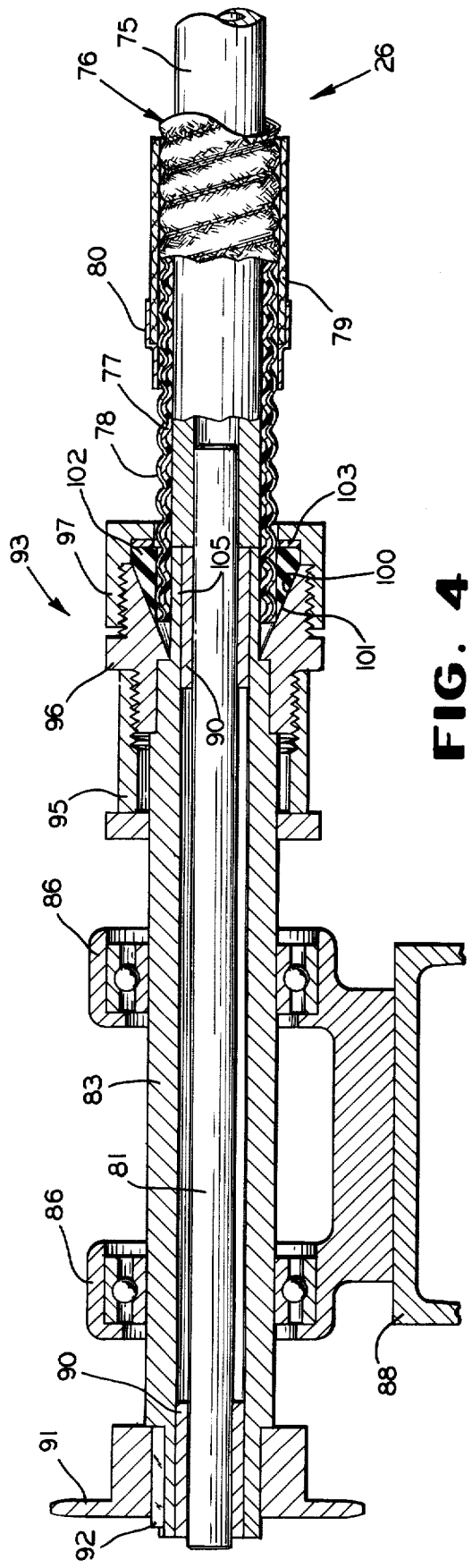
FIG. 4 is a vertical cross sectional view, on an enlarged scale, taken along the line 4—4 of FIG. 3.
Figure 5:
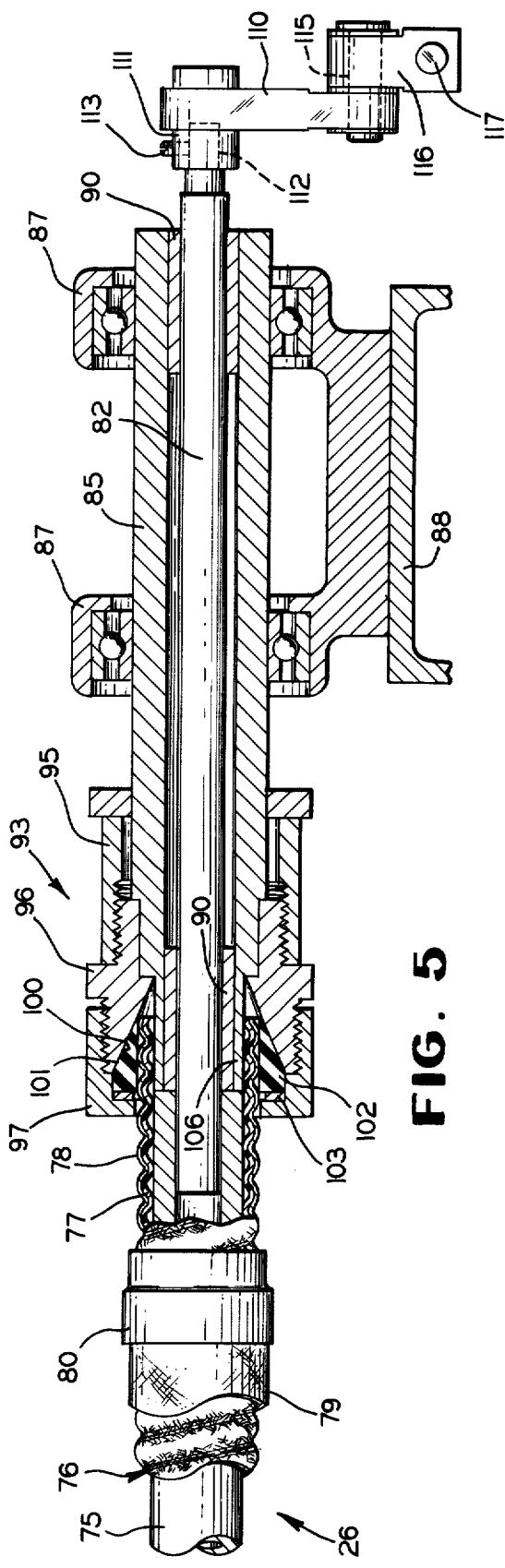
FIG. 5 is a vertical cross sectional view, on an enlarged scale, taken along the line 5—5 of FIG. 3.

According to the present invention, this objectionable distortion is minimized, if not completely eliminated, by the use of pivotal, specially configurated conveyor rolls 26 employed in the bending area and which are disengagable from the glass sheet at the appropriate time to preclude relative frictional movement between the glass sheet and such conveyor rolls. As best shown in FIGS. 2 and 3, each conveyor roll 26 comprises straight opposite end portions 71 and 72 having a common axis and a central, arcuately curved portion 73 joining the two straight end portions 71 and 72. Referring to FIGS. 4 and 5, each conveyor roll 26 comprises an inner, hollow, flexible, stationary, core member 75, preferably formed of seamless steel tubing and an outer, flexible load carrying, rotatable sleeve 76, formed of a convoluted or spiraled tubing preferably composed of a fluorocarbon resin, such as that sold under the trademark "Teflon", constituting a liner 77 covered with a layer of stainless steel mesh 78 and which surrounds the inner core 75. The flexible but durable liner 77 forms an anti-friction bearing surface facilitating rotation of sleeve 76 about the inner core 75. The stainless steel mesh layer 78, attached to and complemental to the convoluted shape of the liner 77, reinforces the same and prevents kinking thereof. If desired, the stainless steel mesh can be impregnated with a coating of fluorocarbon, such as that sold under the trademark Teflon to fill the voids therein. While the outer sleeve 76 is flexible for conforming to the arcuate shape of the inner core 75, it is capable of transmitting torque without significant axial twist or distortion.

The sleeve 76 is covered with an asbestos or fibre glass material 79 to provide a resiliently yieldable, heat resistant, non-marring surface upon which the glass sheets are received. The covering is secured by stretching it over the sleeve 76 and fastening the ends thereto with pressure sensitive tape 80 or in some other suitable manner.

The opposite ends of each stationary inner core 75 are telescopically received upon and secured to a pair of stub shafts 81 and 82 mounted in rotatable collars 83 and 85 journalled for rotation in spaced bearings 86 and 87 carried on rails 88 along opposite sides of the bending apparatus. Suitable sleeve bushings 90 are interposed between the stub shafts 81, 82 and their associated collars 83, 85 to facilitate relative rotation therebetween. A pinion 91, adapted to be driven by a suitable endless drive chain (not shown), is rigidly secured to collar 83 by means of a key 92. This endless drive chain is trained about all the pinions 91 of the series of conveyor rolls 26 for rotating the same in unison at the same angular speed about their respective chordal axes. If desired, similar pinions may be mounted on the collars 85 at the opposite ends of rolls 26 and similarly driven by an endless drive chain to provide a drive for both ends of the conveyor rolls 26.

The opposite ends of each outer sleeve 76 are attached to the collars 83 and 85 by coupling members, generally designated 93, each of which comprises a tubular body 95 welded or otherwise fixedly secured on its associated collar and threaded on one end of a specially configurated, union connecting member 96. The other male threaded end of member 96 receives a female connector member 97 disposed about the outer sleeve 76 for attaching the latter to its respective collar.

The internal surface 100 of the union member 96 adjacent one end thereof is tapered inwardly to engage the outer, conically shaped, complemental surface 101 of a gripping sleeve 102 having a bore for receiving the outer sleeve 76 therethrough. The gripping sleeve 102 is formed of rubber or any other suitable resiliently yieldable, elastomeric material and when compressed radially, exerts a radial clamping force on the outer sleeve 76. The rear end of gripping sleeve 102 is flat and bears against a washer 103 interposed between gripping sleeve 102 and the rear end wall of the female connector member 97.

In attaching the outer sleeve 76 to the two collars 83 and 85, the opposed, reduced diameter end portions 105 and 106 (FIGS. 4 and 5) thereof are telescopically received in the opposite ends of sleeve 76. The female connector 97 is then threaded onto the union member 93, urging the gripping sleeve 102 radially inwardly for clamping the outer sleeve 76 against the reduced diameter end portion of the associated collar. In this manner, the outer sleeves 76 of the rolls 26 are attached to their respective collars for rotation about their own chordal axes, respectively, relative to the inner core 75.

Figure 6:
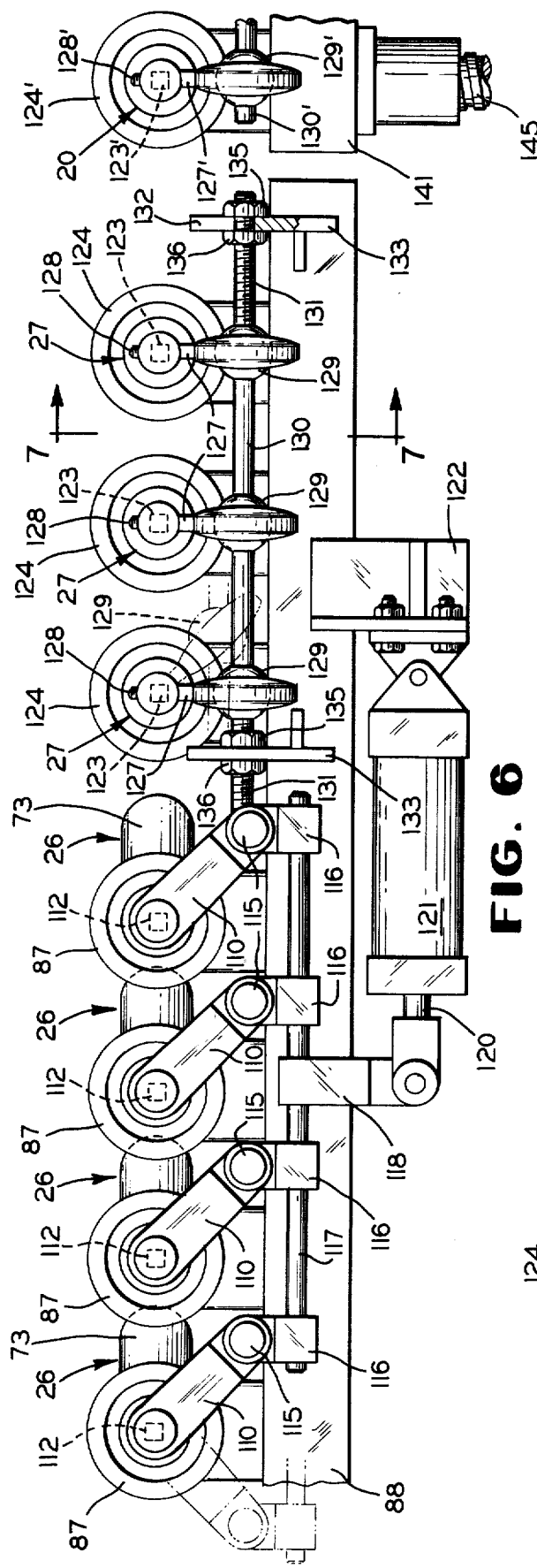
FIG. 6 is an enlarged side elevational view, partly in section, looking in the direction of arrows 6—6 of FIG. 3, and showing the means for shifting a certain series of conveyor rolls and the means for adjusting the attitude of another set of conveyor rolls.
Figure 8:
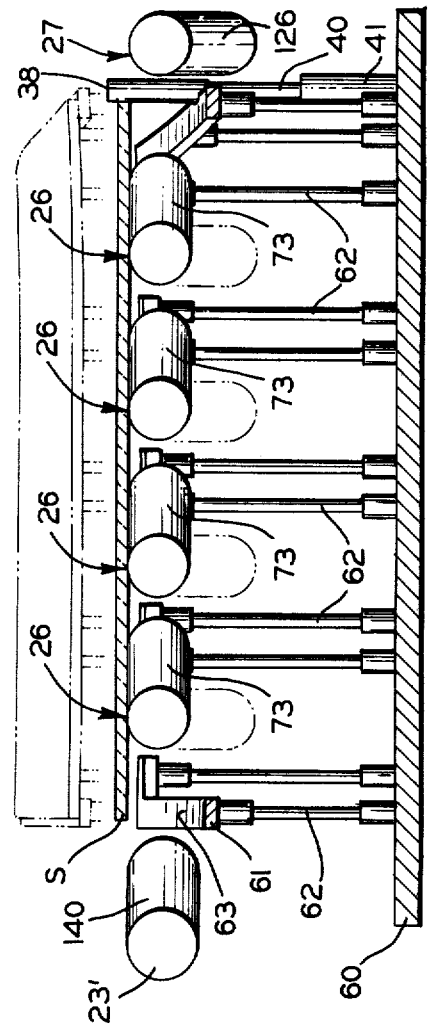
FIG. 8 is a schematic view of the conveying apparatus of this invention showing the conveyor rolls in an upper position in full lines and a lower position in dotted lines.

In addition to rotation about their own chordal axes, the rolls 26 are mounted for pivotal movement in unison between a first position in which the curved portions 73 thereof lie in a common, horizontal plane as shown in full lines in FIG. 8, and a second or lower position in which these curved portions 73 lie in attitudes extending at angles to said common plane as shown in dotted lines in FIG. 8. When in the latter position, the curved portions 73 conjointly define a curved surface complementary to the curvature imparted to the glass sheet. To this end, means are provided for shifting the rolls 26 between the two positions mentioned above, such means comprising a lever 110 having an integral hub portion 111 at one end thereof mounted on an extension 112 formed on each stub shaft 82 and secured thereto by means of a set screw 113. The other end of each lever 110 is pivotally connected, as by means of a pin 115, to a lug 116 in turn attached to a reciprocable rod 117. As best shown in FIG. 6, the levers 110 are maintained in parallelism and are pivoted simultaneously upon actuation of the rod 117. A connecting member 118, attached to the rod 117, is connected to the piston rod 120 of a fluid cylinder 121 mounted on a bracket 122 attached to the structural frame 33. Extension of the piston rod 120 effects axial movement of rod 117 toward the left as viewed in FIG. 6 to swing the levers 110 in unison in a clockwise direction for shifting the central portions 73 of rolls 26 from an upper horizontal disposition to a lower angular disposition i.e., from the full line position to the dotted line position shown in FIG. 8.

The central curved portions 73 of rolls 26 are initially disposed in their upper positions shown in full lines in FIG. 8 wherein they lie in a common horizontal plane to support a heated flat glass sheet entering the bending section 16. The rod 117 is adapted to be actuated simultaneously with the upward movement of the female press member 32 so that the rolls 26 are pivoted downwardly in angular attitudes or planes relative to such common plane out of engagement with the glass sheet just as the marginal edge portions of the sheet are engaged by the shaping rail 61 to lift the same upwardly. After bending, when the bent sheet is returned to the conveyor rolls 26, the curved portions 73 of the latter conjointly define a curved surface complementary to the curvature imparted to the sheet and preclude any sagging out of the desired curvature as the bent sheet is conveyed out of the bending section 16. It should be understood that the degree of curvature imparted to the central portions 73 of conveyor rolls 26 is dictated by the desired curvature formed in the glass sheet and may vary, as desired. Because of the flexibility of the rolls 26, they can be initially bent to any desired geometrical form, including angular or V-shaped bends, to conform to the shape of the bent glass sheet being produced in a given production run and can be replaced by differently shaped rolls when bending glass sheets of different configurations. Once bent into the desired shape, the rolls are sufficiently rigid to remain set in this shape and will not be deformed out of such shape by the loading of the glass sheets thereon. Instead of physically bending the rolls 26, variance in the curvature of the surface conjointly defined thereby may be effected by adjusting the stroke of cylinder 121 to vary their lower angular attitudes.

Upon leaving the bending section 16, the bent glass sheets S are transferred from the series of conveyor rolls 26 to the series of conveyor rolls 27 interposed between the bending section 16 and tempering section 17. The conveyor rolls 27 also are formed with arcuately curved central portions 126, which conjointly define a supported surface conforming to the curvature of the bent glass sheet S. Since the conveyor rolls 27 are of identical construction and rotatable about their chordal axes in the same manner as rolls 26, no further detailed description thereof is believed necessary, except for the means operative to adjust their angular attitudes, as described below.

Figure 7:
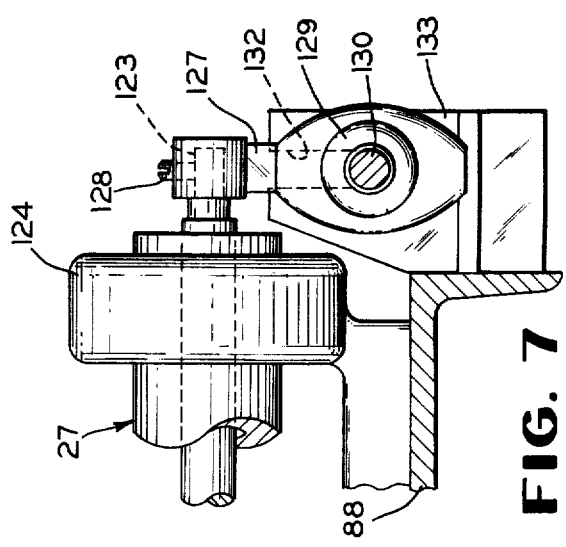
FIG. 7 is an enlarged fragmentary front elevational view, partly in section along line 7—7 of FIG. 6, showing details of the roll shifting means.

In order to change the curvature of the supporting surface defined by the central portions 126 of rolls 27 without shutting down the apparatus and replacing such rolls, the stub shaft extension 123 of each conveyor roll 27 projecting laterally outwardly beyond its associated bearing 124 is provided with a lever 127 (FIGS. 6 and 7) suitably attached thereto as by means of a set screw 128. The several levers 127 are mounted on universal joints 129, respectively, connected to a common rod 130 having opposite threaded end portions 131 extending through the slots 132 of a pair of axially spaced brackets 133 secured to suitable supporting structure. A pair of lock nuts 135 and 136 are tightened on each threaded end portion 131 on opposite sides of the associated bracket 133 to secure the rod 130 in place. When it is desired to change the supporting surface defined by the roll central portions 126, it is only necessary to loosen nuts 135, 136, manually shift rod 130 in the proper direction, and then tighten the lock nuts to secure the roll central portions in the selected attitudes. Accordingly, the effective roll supporting surface can be readily adjusted in conformance with the curvature of the sheet being bent.

The series of conveyor rolls 28 also are identical in construction to rolls 26 and are provided with arcuately curved central portions 140 defining a supporting surface complementary to the shape of the bent glass sheet being conveyed thereby. The central portions 140 of this series of conveyor rolls can be adjusted by means similar to and operative in the same manner as the roll attitude adjusting means utilized in connection with conveyor rolls 27, and the same reference characters primed are used to identify similar parts. If desired, a single actuating rod 130 can extend longitudinally along both series of rolls 27 and 28 to simultaneously adjust both when necessary. The reason for showing the series of conveyor rolls 27 independently adjustable is that they can be mounted on a portable frame adapted to be conveniently inserted in or removed from the area between the bending section 16 and tempering section 17. Thus, the curvature imparted to the glass sheet during the bending thereof is continuously maintained during its course of travel through the bending section 16 and the tempering section 17 by means of the pivotal, arcuately curved conveyor rolls 26 and the adjustable but fixed conveyor rolls 27 and 28.

In addition to changing the attitudes of the central portions 140 of rolls 28 in tempering section 17, it is sometimes necessary to bodily adjust the height of the series of rolls 28 in order to position them at the same vertical level as rolls 26 and 27 to provide a smooth transfer of the bent glass sheet from the bending section 16 to tempering section 17. To this end, the opposite bearings 124' supporting rolls 28 are mounted on longitudinally extending side rails 141 adapted to be displaced vertically for bodily raising and lowering the series of conveyor rolls 28. The means for raising and lowering side rails 141 comprises laterally aligned jack screw assemblies 142 located adjacent opposite ends of tempering section 17 and supported on laterally spaced, longitudinally extending beams 143 forming a part of the support structure. Each jack screw assembly comprises an elongated, vertical screw 145 fixedly secured at its upper end to side rail 141 and extending downwardly through a rotatable nut (not shown) journalled for rotation in a jack screw casing 146 but fixed against axial movement therein. A worm (also not shown) contained in the casing 146 is engaged with the nut therein and is fixedly secured to a shaft 147 driven by a suitable power source (not shown). Thus, rotation of the shafts 147 of the several jack screw assemblies 142 effects, via their respective worm and nut arrangements, extension or retraction of screws 145 to raise and lower the series of conveyor rolls 28. It should be appreciated that the opposed blastheads 29 also are vertically adjustable by means similar to the jack screw assemblies 142 to maintain the spacing of their associated tube outlets a predetermined distance from the opposed surfaces of the glass sheets being tempered. This adjustment is dictated by the shape of the glass sheet being treated and would be carried out upon vertical adjustment of the conveyor rolls 28.

In operation, heat-softened sheets of glass S leaving the furnace 18 are advanced in a horizontal path and transferred from the conveyor rolls 23 onto the conveyor rolls 26, which have been shifted to a position disposing their arcuately curved central portions 73 in a common horizontal plane for properly supporting the heated flat glass sheets being conveyed thereby. As best shown in FIG. 3, the last roll 23' of the series of rolls 23 adjacent the series of rolls 26 is arcuately curved in the common plane of the central portions 73 of rolls 26 to minimize the space between such last roll 23' and the first roll 26 and maintain adequate support for the glass sheet during its transfer from one to the other set of rolls. The roll 23' is of the same diameter as the other rolls 23, which are larger in diameter than the diameter of rolls 26, and is fixedly mounted against pivotal movement, but otherwise has the same inner core-outer rotatable sleeve construction as rolls 26.

A photoelectric cell (not shown), or other suitable detection device, senses the entry of the glass sheet into the bending section 16 for initiating a bending cycle by energizing timing mechanisms which control the actions of the press actuating cylinder 68, the roll shifting cylinder 121, and the stop cylinders 41. The timing mechanisms are so designed that the female press member 32 begins its ascent by actuation of cylinder 68 and engages the marginal edge portions of the flat glass sheet just prior to the leading edge thereof engaging the locator stops 38. As the shaping rail 61 engages the glass sheet marginal edge portions, the roll shift cylinder 121 becomes operative to pivot the central portions 73 of the conveyor rolls 26 downwardly into their angular attitudes out of contact with the sheet so that the latter is supported entirely along its marginal edges on shaping rail 61. Since the heat-softened glass sheet is supported only along such marginal edge portions, the inner central portions thereof tend to sag upon upward movement of the sheet. However, the rolls 26 have been pivoted downwardly out of the way so that the sheet inner central portions can sag freely without contacting the rolls as otherwise would occur if left in their original common plane.

The engagement of the shaping rail 61 with the glass sheet and the disengagement of the roll central portions 73 therefrom occurs substantially simultaneously and just prior to, say a few microseconds before, engagement of the leading edge of the sheet with stops 38 so that the rolls 26 are disengaged from the glass sheet upon stoppage thereof. Accordingly, the possibility of marring the glass sheet due to the relative frictional movement between the peripheral surfaces of the rotating rolls 26 and the stationary glass sheet is eliminated to thereby significantly minimize, if not entirely eliminate, distortion otherwise caused by such relative frictional movement.

As the sheet S continues to be lifted for pressing engagement against the male press member 31, the locator stops 38 are lowered to a point below the level of the top surfaces of conveyor rolls 26 when in their lowermost attitudes to permit advancement of the sheet when subsequently returned to the conveyor rolls 26.

After the glass sheet has been shaped between the press members 31 and 32 to impart the desired curvature thereto, the female press member 32 is lowered below the downwardly directed conveyor rolls 26 to deposit the bent sheet thereon for advancement out of the bending section 16. When shifted into their lower positions, the central portions of rolls 26 assume attitudes conjointly defining a supporting surface complementary to the curvature of the bent sheet. The bent sheet is advanced along such supporting surface at the proper rate of speed out of the bending section 16 and onto the successive contoured supporting surfaces defined by conveyor rolls 27 and 28, respectively, into and through the tempering section 17 between the opposed tubes 30 of blastheads 29 at a speed promoting a proper rate of cooling to obtain the desired temper in the sheets. When the trailing edge of the bent sheet leaves the last conveyor roll 26 in bending section 16, the cylinder 121 is actuated by suitable control means responsive to a signal generated by a photocell or the like, to reciprocate rod 117 and pivot the rolls 26 into their upper positions wherein the central portions 73 thereof lie in the aforementioned common plane in readiness for the next bending cycle.

From the foregoing, it is apparent that the objects of the invention have been fully accomplished. An improved method and apparatus is provided for supporting and conveying glass sheets between upper and lower press members of a glass bending apparatus in a manner alleviating objectionable roll distortion. This is effected by the provision of a series of arcuately curved conveyor rolls pivoted in unison between an upper position in which the curved portions of the rolls lie in a common horizontal plane in engagement with a flat heat-softened glass sheet for conveying the same into bending position, and a lower position in which the roll curved portions are moved into downwardly directed, angular attitudes relative to such common plane and out of engagement with the heat-softened glass sheet upon the initiation of the lifting thereof by the lower press member toward the upper press member for pressing therebetween. Each of the conveyor rolls comprises an inner core member and an outer load-carrying sleeve rotatable about the inner core member and pivotal therewith between the aforementioned upper and lower positions. While the conveyor rolls 26 are flexible, enabling the desired curvature to be imparted thereto, they are sufficiently rigid to remain fixed in their bent configurations and thereby maintain the glass sheets in their desired curvatures.

It is to be understood that the form of the invention herewith shown and described is to be taken as an illustrative embodiment of the same, and that various changes in the shape, size and arrangement of parts, as well as various procedural changes, may be resorted to without departing from the spirit of the invention.

We claim:

1. In a method of bending glass sheets, the steps of heating a flat sheet of glass to the softening point thereof, supporting the heated sheet in a substantially horizontal plane on a plurality of conveyor rolls having arcuately shaped supporting portions lying in a common horizontal plane, rotating said conveyor rolls to advance said heated sheet into a position above a lower press member having an upwardly facing shaping surface, moving said shaping surface upwardly to engage the marginal edges of said sheet to lift said sheet and initiate a bending cycle while swinging said conveyor roll supporting portions downwardly at angular attitudes relative to said common plane out of engagement with said sheet to preclude relative frictional movement therebetween.

2. A method according to claim 1, wherein said conveyor roll supporting portions are displaced out of engagement with said glass sheet simultaneously with the engagement thereof with said upwardly moving shaping surface.

3. A method according to claim 2, wherein said simultaneous displacement of said roll supporting portions and said shaping surface glass engagement occur prior to termination of the advancement of said glass sheet.

4. A method according to claim 1, wherein said conveyor roll supporting portions are swung into attitudes conjointly defining a supporting surface complementary to the curvature of the glass sheet after the bending thereof to receive the same and retain said curvature therein.

5. In apparatus for the horizontal bending of glass sheets, a frame, a bending member mounted on said frame and having an upwardly facing shaping surface formed thereon, a plurality of rotatable conveyor rolls mounted on said frame for supporting a glass sheet above said shaping surface in position to be engaged thereby, and means for moving said bending member upwardly to engage the marginal edges of said sheet and lift the same from said conveyor rolls into pressing engagement with an upper complemental bending member; the improvement wherein said conveyor rolls are provided with arcuately shaped central portions, and means for pivoting said conveyor rolls to displace said central portions of said rolls from a common plane supporting said glass sheet prior to bending to angular positions disengaging said roll central portions from said glass sheet upon engagement of said press member shaping surface with said sheet marginal edges during upward movement of said bending member.

6. Apparatus according to claim 5, wherein each of said conveyor rolls comprises an inner core member and an outer load supporting sleeve, and means rotating said sleeve about said inner core member.

7. Apparatus according to claim 6, wherein said inner core member is formed of a hollow, flexible metallic tubing.

8. Apparatus according to claim 6, wherein said outer sleeve is formed of a flexible, hollow, reinforced elastomeric tube capable of transmitting torque without significant distortion.

9. Apparatus according to claim 8, wherein said elastomeric tube is formed of spiral wound fluorocarbon reinforced with an outer layer of stainless steel mesh.

10. Apparatus according to claim 6, wherein said sleeve is provided with a covering of a resiliently yieldable, heat resistant, non-abrasive material.

11. Apparatus according to claim 5, wherein said pivoting means includes a lever connecting each of said conveyor rolls to a connecting rod, and means for actuating said connecting rod to pivot said conveyor rolls in unison.

12. Apparatus for bending and tempering glass sheets comprising: a conveyor for supporting and conveying a glass sheet in a substantially horizontal path successively through a bending section and a tempering section; a press member mounted in said bending section and having an upwardly facing shaping surface formed thereon; said conveyor having a series of rotatable conveyor rolls mounted in said bending section for supporting a glass sheet above said shaping surface in position to be engaged thereby; means for moving said press member upwardly to engage the marginal edges of said sheet and lift the same from said conveyor rolls into pressing engagement with an upper complementary shaped press member; said conveyor rolls having arcuately shaped central portions; and means for pivoting said conveyor rolls to displace said central portions of said rolls from a common plane supporting said glass sheet prior to bending to angular positions disengaging said roll central portions from said glass sheet upon engagement of said press member shaping surface with said sheet marginal edges during upward movement of said press member.

13. Apparatus according to claim 12, wherein said angular positions of said several roll central portions define a supporting surface complementary to the shape imparted to said sheet upon the bending thereof.

14. Apparatus according to claim 12, wherein each of said conveyor rolls comprises an inner core member and an outer load supporting sleeve rotatable about said inner core member; said inner core member being formed of a hollow, flexible, metallic tubing; and said outer sleeve being formed of a flexible, hollow, spiral wound elastomeric material reinforced with an outer layer of metallic mesh and capable of transmitting torque without significant distortion.

15. Apparatus according to claim 12, wherein said pivoting means includes a lever connecting each of said conveyor rolls to a connecting rod, and means for actuating said connecting rod to pivot said conveyor rolls in unison.

16. Apparatus according to claim 12, wherein said conveyor includes conveyor rolls downstream of said series of conveyor rolls and in said tempering section, respectively, having arcuately shaped central portions disposed in downwardly directed angular positions corresponding to the angular positions of said first mentioned series of conveyor rolls.

17. Apparatus according to claim 16, including means for adjusting the angular position of said conveyor rolls downstream of said series of conveyor rolls and in said tempering section, respectively.

18. Apparatus according to claim 16, including means for bodily adjusting the vertical disposition of said conveyor rolls in said tempering section.

* * * * *